(12) United States Patent
Kato

(10) Patent No.: US 11,777,101 B2
(45) Date of Patent: Oct. 3, 2023

(54) NON-AQUEOUS ELECTROLYTE SECONDARY BATTERY

(71) Applicant: TOYOTA JIDOSHA KABUSHIKI KAISHA, Toyota (JP)

(72) Inventor: Masaki Kato, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 375 days.

(21) Appl. No.: 17/068,873

(22) Filed: Oct. 13, 2020

(65) Prior Publication Data
US 2021/0159505 A1 May 27, 2021

(30) Foreign Application Priority Data
Nov. 26, 2019 (JP) .................. 2019-213200

(51) Int. Cl.
*H01M 4/62* (2006.01)
*H01M 4/66* (2006.01)

(52) U.S. Cl.
CPC ............. *H01M 4/66* (2013.01); *H01M 4/624* (2013.01)

(58) Field of Classification Search
None
See application file for complete search history.

(56) References Cited

U.S. PATENT DOCUMENTS

| 2012/0058375 A1 | 3/2012 | Tanaka et al. |
| 2012/0115030 A1 | 5/2012 | Tanaka et al. |
| 2013/0048340 A1 | 2/2013 | Bando et al. |
| 2015/0050541 A1 | 2/2015 | Kinoshita et al. |
| 2019/0273236 A1 | 9/2019 | Kikuchi et al. |

(Continued)

FOREIGN PATENT DOCUMENTS

| CN | 1996643 A | 7/2007 |
| JP | 2008204920 A | 9/2008 |

(Continued)

OTHER PUBLICATIONS

Office Action issued to U.S. Appl. No. 16/919,523 dated Apr. 27, 2022.

(Continued)

*Primary Examiner* — Haixia Zhang
(74) *Attorney, Agent, or Firm* — Dickinson Wright, PLLC

(57) ABSTRACT

A non-aqueous electrolyte secondary battery includes a positive electrode, a negative electrode, and a non-aqueous electrolyte. The positive electrode includes a positive electrode current collector, a positive electrode active material layer on a part of a surface of the positive electrode current collector containing a positive electrode active material, and an insulating layer on other parts of the surface of the positive electrode current collector containing an inorganic filler. The negative electrode includes a negative electrode current collector, and a negative electrode active material layer on a part of a surface of the negative electrode current collector containing a negative electrode active material. The insulating layer includes a first insulating layer disposed along an end portion of the positive electrode active material layer, and a second insulating layer formed at a position separated from the first insulating layer and facing an end portion of the negative electrode active material layer.

4 Claims, 4 Drawing Sheets

(56) References Cited

U.S. PATENT DOCUMENTS

2020/0274150 A1    8/2020   Katayama et al.
2020/0373558 A1   11/2020   Park et al.
2021/0194007 A1*   6/2021   Danno .................. H01G 11/24

FOREIGN PATENT DOCUMENTS

| JP | 2009134915 A  | 6/2009 |
| JP | 2017143004 A  | 8/2017 |
| JP | 2017-157471 A | 9/2017 |
| KR | 10-2264738 B1 | 6/2021 |

OTHER PUBLICATIONS

Office Action issued to U.S. Appl. No. 16/919,523 dated Nov. 18, 2022.

\* cited by examiner

NON-AQUEOUS ELECTROLYTE SECONDARY BATTERY

CROSS-REFERENCE TO RELATED APPLICATION

This application claims priority to Japanese Patent Application No. 2019-213200 filed on Nov. 26, 2019, incorporated herein by reference in its entirety.

BACKGROUND

1. Technical Field

The present disclosure relates to a non-aqueous electrolyte secondary battery.

2. Description of Related Art

The non-aqueous electrolyte secondary battery has a high energy density with a lightweight, and thus is preferably used as a portable power supply, a high output power supply mounted on a vehicle, or the like. In the non-aqueous electrolyte secondary battery, power storage elements having a configuration in which a positive electrode and a negative electrode are insulated by a separator or the like are stacked and housed in one battery case. Here, in the non-aqueous electrolyte secondary battery, in order to suppress the deposition of electrolyte ions on the negative electrode, an active material layer of the negative electrode may be designed to have a dimension in a width direction wider than that of an active material layer of the positive electrode.

SUMMARY

In such a type of the non-aqueous electrolyte secondary battery, in order to more reliably suppress a short circuit between the positive electrode and the negative electrode, it has been proposed that an insulating layer is provided to overlap an end portion of a positive electrode active material layer from a surface of a current collector for an electrode (for example, see Japanese Unexamined Patent Application Publication No. 2017-143004 (JP 2017-143004 A). JP 2017-143004 A discloses that since an insulating layer is provided with a fine crack formed on a surface or an inside due to paste drying at the time of manufacturing as a groove, a wall thickness of the groove becomes thin, and the groove becomes softer than the other portions, and accordingly, even in a case where a physical load was applied to the insulating layer, falling off of the insulating layer and the end portion of the positive electrode active material layer can be suppressed. However, the insulating layer that is configured to suppress desorption or short circuit even if a crack exists may need to contain a large amount of binder to some extent, have a certain amount of thickness, or contain a specific type of binder.

The present application provides a non-aqueous electrolyte secondary battery having a new configuration capable of appropriately suppressing a short circuit between electrodes.

In the configuration of the non-aqueous electrolyte secondary battery disclosed in JP 2017-143004 A, when the insulating layer is provided over a portion where a short circuit between a positive electrode and a negative electrode is concerned, there is room for improvement in terms of an increase in cost and manufacturing time (for example, drying time). An aspect of the present disclosure provides a non-aqueous electrolyte secondary battery having a new configuration.

That is, the aspect of the present disclosure includes a positive electrode, a negative electrode facing the positive electrode, and a non-aqueous electrolyte. The positive electrode includes a positive electrode current collector, a positive electrode active material layer which is provided on a part of a surface of the positive electrode current collector and contains a positive electrode active material, and an insulating layer which is provided on other parts of the surface of the positive electrode current collector and contains an inorganic filler. The negative electrode includes a negative electrode current collector, and a negative electrode active material layer which is provided on a part of a surface of the negative electrode current collector and contains a negative electrode active material. The insulating layer includes a first insulating layer disposed along an end portion of the positive electrode active material layer, and a second insulating layer formed at a position which is separated from the first insulating layer and faces an end portion of the negative electrode active material layer.

According to the aspect, the insulating layer is separately formed at a position along the end portion of the positive electrode active material layer and the position facing the end portion of the negative electrode active material layer. Accordingly, it is possible to suppress a short circuit due to decomposition of the positive electrode active material layer, and to appropriately dispose the insulating layer at the position where the short circuit between the positive electrode and the negative electrode is likely to occur. Also, since the insulating layer is not provided excessively, it is possible to suppress an increase in battery resistance or a decrease in volumetric capacity ratio.

In the aspect, an average thickness of the second insulating layer may be equal to or greater than a thickness of the negative electrode current collector. According to the aspect, the second insulating layer can suppress a short circuit due to a burr of the negative electrode current collector, which may be formed when the negative electrode is cut.

In the aspect, the first insulating layer may be formed to be interposed between the positive electrode current collector and the end portion of the positive electrode active material layer and to cover the end portion. According to the aspect, it is possible to suppress, in advance, a short circuit, due to current concentration at the end portion of the positive electrode active material layer and decomposition of the positive electrode active material.

In the aspect, an end portion of the negative electrode on a side facing the second insulating layer may be formed by a cut surface. In other words, the end portion of the negative electrode on a side facing the second insulating layer may be a cut surface. According to the aspect, as described above, it is possible to suppress a short circuit due to not only a corner of the negative electrode active material layer but also a burr of the negative electrode current collector. Therefore, when the aspect of the present disclosure is applied to a battery in which an end portion of a negative electrode is formed by a cut surface, an effect thereof can be remarkably exhibited.

The non-aqueous electrolyte secondary battery according to the aspect of the present disclosure can achieve a balance between safety at the time of overcharging and low resistance. Therefore, for example, when the non-aqueous electrolyte secondary battery is adopted for a high capacity battery having a stacked structure in which a plurality of power generating elements including a positive electrode and a negative electrode is stacked, in particular, the effect thereof is remarkably exhibited. The non-aqueous electrolyte secondary battery can also be applied to a secondary battery for applications in which the battery is repeatedly charged and discharged with a high current at a high rate, and easily reaches a high temperature due to charging and discharging of a battery itself. Furthermore, the non-aqueous electrolyte secondary battery can be applied to a secondary battery for applications in which the battery is used closely by humans and needs to have high safety. Therefore, the non-aqueous electrolyte secondary battery of the aspect of the present disclosure can be used, for example, as a power supply (main power supply) for driving a vehicle, and especially as a power supply for driving a hybrid vehicle, a plug-in hybrid vehicle, or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
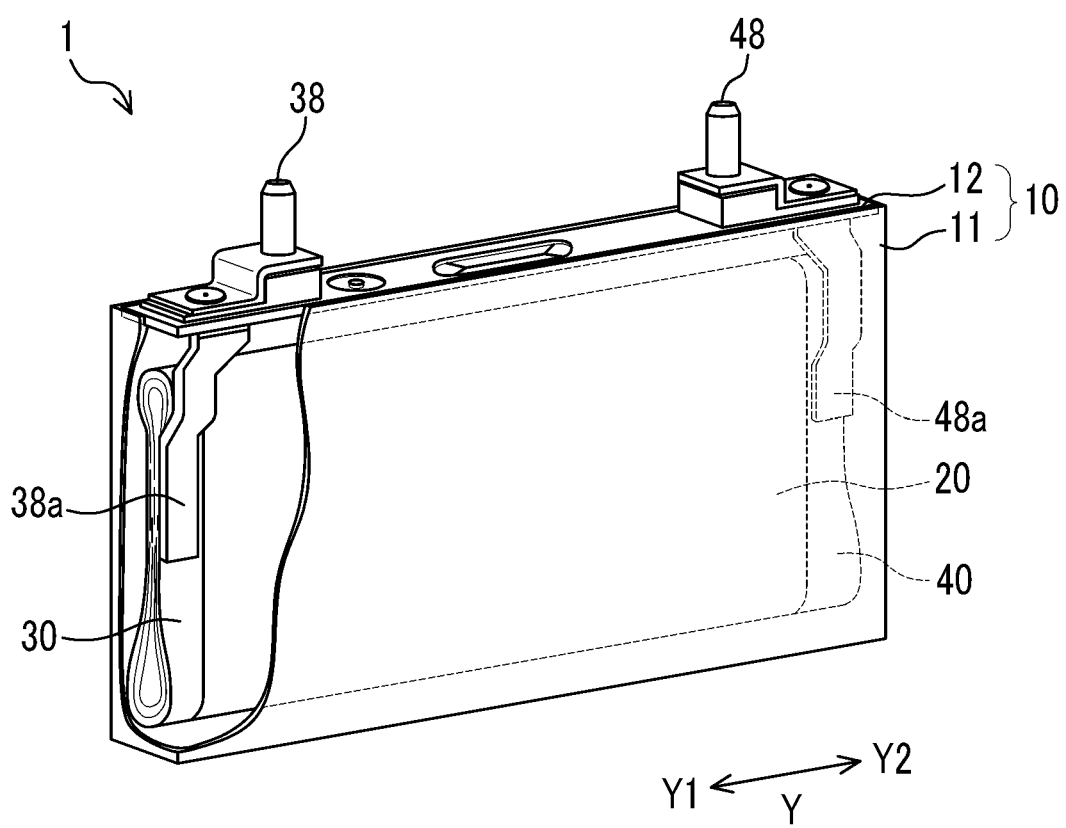
FIG. 1 is a cutaway perspective view schematically showing a configuration of a non-aqueous electrolyte secondary battery according to an embodiment.

Hereinafter, an embodiment of a non-aqueous electrolyte secondary battery disclosed herein will be described. Matters requested for carrying out the present disclosure (for example, a structure of a secondary battery that does not characterize the present specification), other than matters particularly referred to in the present specification (for example, disposition of an insulating layer) can be understood as a design matter of those skilled in the art based on the related art in the field. The present disclosure can be carried out based on the contents disclosed in the present specification and common general technical knowledge in the field. Dimensional relationships (such as length, width, or thickness) in the drawings shown below may not reflect actual dimensional relationships. In the present specification, the notation "A to B" indicating a numerical range means "A or more" and "B or less", and for example, includes the meaning of "preferably larger than A" and "preferably smaller than B".

In the present specification, the "non-aqueous electrolyte secondary battery" refers to a general battery that uses a non-aqueous electrolyte as a charge carrier and can be repeatedly charged and discharged as the charge carrier moves between a positive electrode and a negative electrode. An electrolyte in the non-aqueous electrolyte secondary battery may be, for example, a non-aqueous electrolytic solution, a gel electrolyte, or a solid electrolyte. Such non-aqueous electrolyte secondary battery includes a lithium polymer battery, a lithium ion capacitor, and the like, in addition to batteries generally called a lithium ion battery and a lithium secondary battery. Although not limited to the following description, the technology disclosed herein will be described by taking the case where the non-aqueous electrolyte secondary battery is a lithium ion secondary battery as an example.

Lithium Ion Secondary Battery

Figure 2:
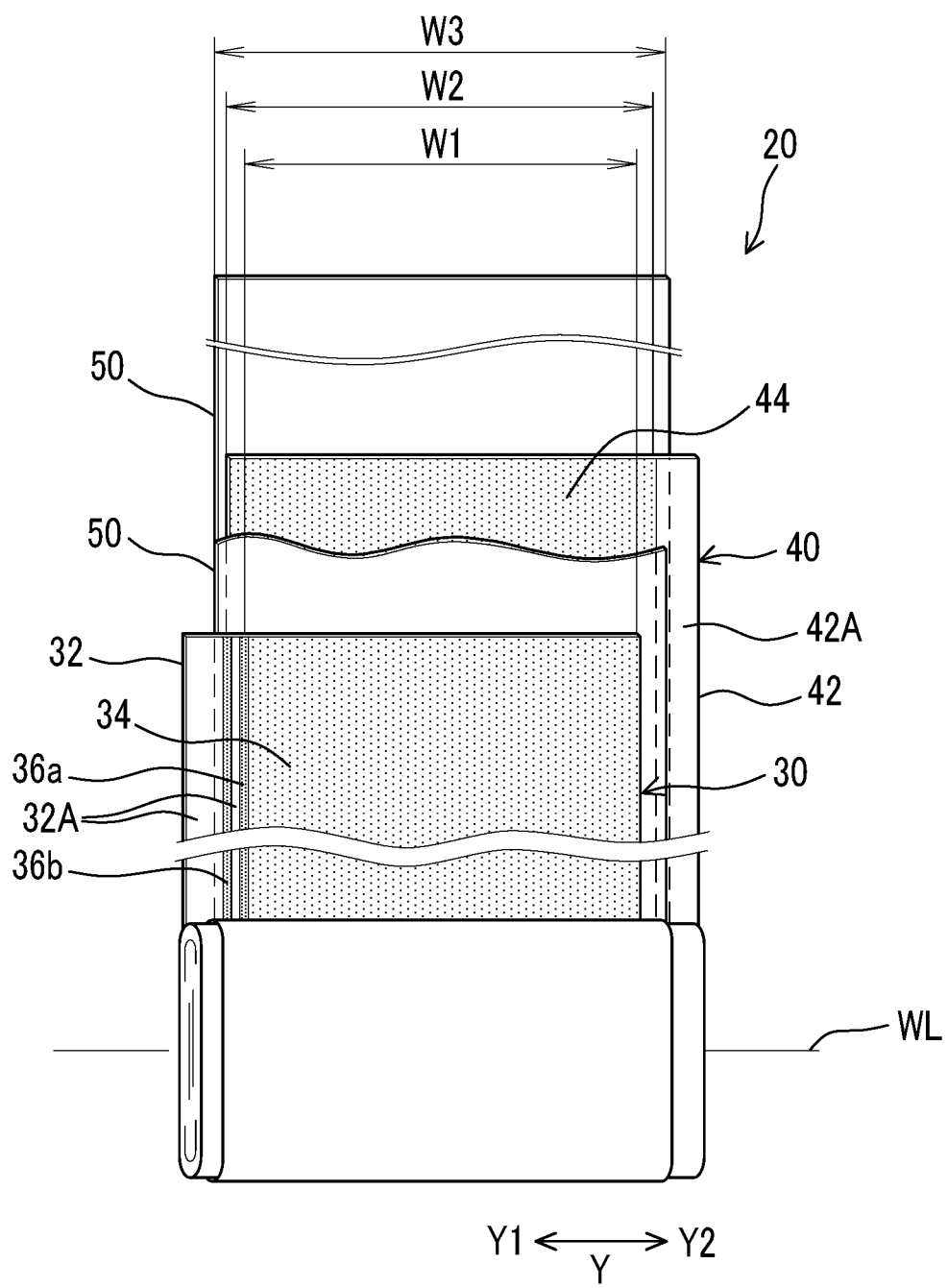
FIG. 2 is a partial development view illustrating a configuration of a wound electrode body.
Figure 3:
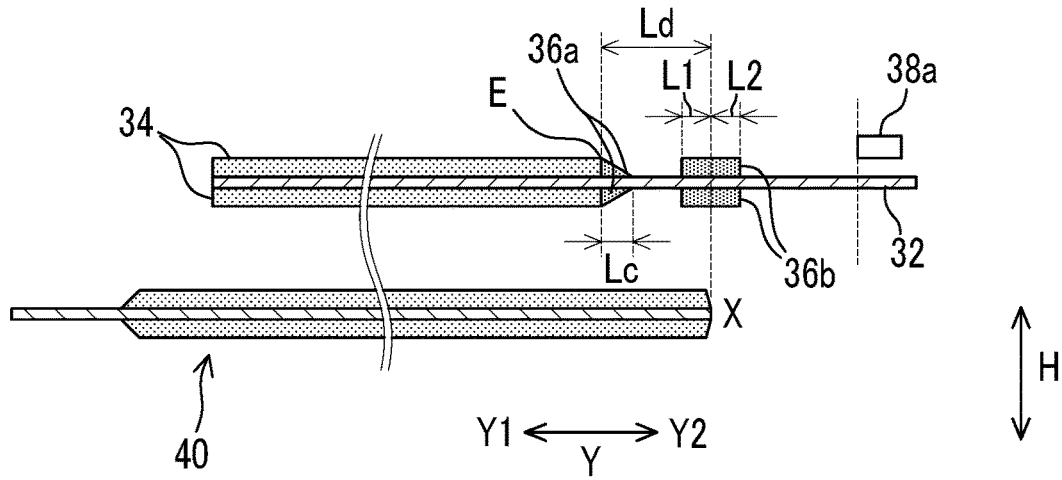
FIG. 3 is a sectional view of a main part illustrating a disposition of insulating layers of the non-aqueous electrolyte secondary battery according to an embodiment.

FIG. 1 is a cutaway perspective view showing a configuration of a lithium ion secondary battery (hereinafter, simply referred to as "secondary battery") 1 according to an embodiment. FIG. 2 is a partial development view illustrating a configuration of a wound electrode body 20. FIG. 3 is a sectional view of a main part of the wound electrode body 20. Reference symbols H and Y in FIGS. 1 to 4 refer to a thickness direction and a width direction of an electrode. Further, in the width direction Y, a direction toward the center in the width direction may be referred to as Y1, and a direction toward an opposite side (an end portion side in the width direction) may be referred to as Y2. Note that the directions are solely directions determined for convenience of description, and do not limit installation form of the lithium ion secondary battery at all.

A lithium ion secondary battery 1 includes a flat wound electrode body 20, a non-aqueous electrolyte (not shown), and a flat rectangular battery case 10. The battery case 10 is an outer container that houses the wound electrode body 20 and the non-aqueous electrolyte. As a material of the battery case 10, for example, a metal material having good heat conductivity with lightweight, such as aluminum is preferred. The battery case 10 includes a bottomed rectangular parallelepiped case body 11 having an opening, and a lid member (sealing plate) 12 that closes the opening. A lid member 12 is a rectangular plate member. A positive electrode terminal 38 and a negative electrode terminal 48 for external connection project from the lid member 12 toward the outside of the case.

The wound electrode body 20 is formed in a manner that a strip-shaped positive electrode 30 and a strip-shaped negative electrode 40 are stacked in a state of being insulated by a strip-shaped separator 50, and wound with a width direction orthogonal to the longitudinal direction as a winding axis WL. The wound electrode body 20 has a flat shape and has an oval shape in a section in the width direction Y. The width direction of the battery case 10 in FIG. 1 is a direction coinciding with the winding axis WL of the wound electrode body 20.

The positive electrode 30 includes a positive electrode current collector 32, a positive electrode active material layer 34, and an insulating layer 36. The positive electrode current collector 32 holds the positive electrode active material layer 34 and the insulating layer 36 on a surface thereof. The positive electrode current collector 32 has other region (hereinafter referred to as a non-coated portion) that does not hold the positive electrode active material layer 34 and the insulating layer 36. The positive electrode active material layer 34 is a porous body containing a positive electrode active material and can be impregnated with an electrolytic solution. The positive electrode active material releases or stores lithium ions, which are charge carriers, to or from the electrolytic solution. The positive electrode active material layer 34 is provided on a part of the surface (one surface or both surfaces) of the positive electrode current collector 32. The positive electrode current collector 32 is a member configured to supply or collect charges to or from the positive electrode active material layer 34. The positive electrode current collector 32 is electrochemically stable in a positive electrode environment in a battery and is more preferably formed of a conductive member made of a metal having good conductivity (such as aluminum, an aluminum alloy, nickel, titanium, and stainless steel).

In the positive electrode active material layer 34, typically, a powdery positive electrode active material is bonded together with a conductive material by a binder (binding agent) and is bonded to the positive electrode current collector 32. As the positive electrode active material, various materials used in the related art as a positive electrode active material of a lithium ion secondary battery can be used without particular limitation. Preferred examples thereof include particles of an oxide (lithium transition metal oxide) containing lithium and a transition metal element as constituent metal elements, such as lithium nickel oxide (for example, $LiNiO_2$), lithium cobalt oxide (for example, $LiCoO_2$), lithium manganese oxide (for example, $LiMn_2O_4$), and composites of thereof (for example, $LiNi_{0.5}Mn_{1.5}O_4$ and $LiNi_{1/3}Co_{1/3}Mn_{1/3}O_2$), and particles of phosphate containing lithium and a transition metal element as constituent metal elements, such as lithium manganese phosphate ($LiMnPO_4$) and lithium iron phosphate ($LiFePO_4$). Such a positive electrode active material layer 34 can be produced, for example, by supplying a positive electrode paste, obtained by dispersing a positive electrode active material, a conductive material, and a binder (for example, acrylic resin such as a methacrylic acid ester polymer, vinyl halide resin such as polyvinylidene fluoride (PVdF), and polyalkylene oxide such as polyethylene oxide (PEO)) in an appropriate dispersion medium (For example, N-methyl-2-pyrrolidone), to the surface of the positive electrode current collector 32 and then removing the dispersion medium by drying. In the configuration including the conductive material, as the conductive material, for example, a carbon material such as carbon black (typically, acetylene black or Ketjenblack), activated carbon, graphite, and carbon fiber can be preferably used. The materials may be used alone or two or more kinds thereof may be used in combination.

Figure 4:
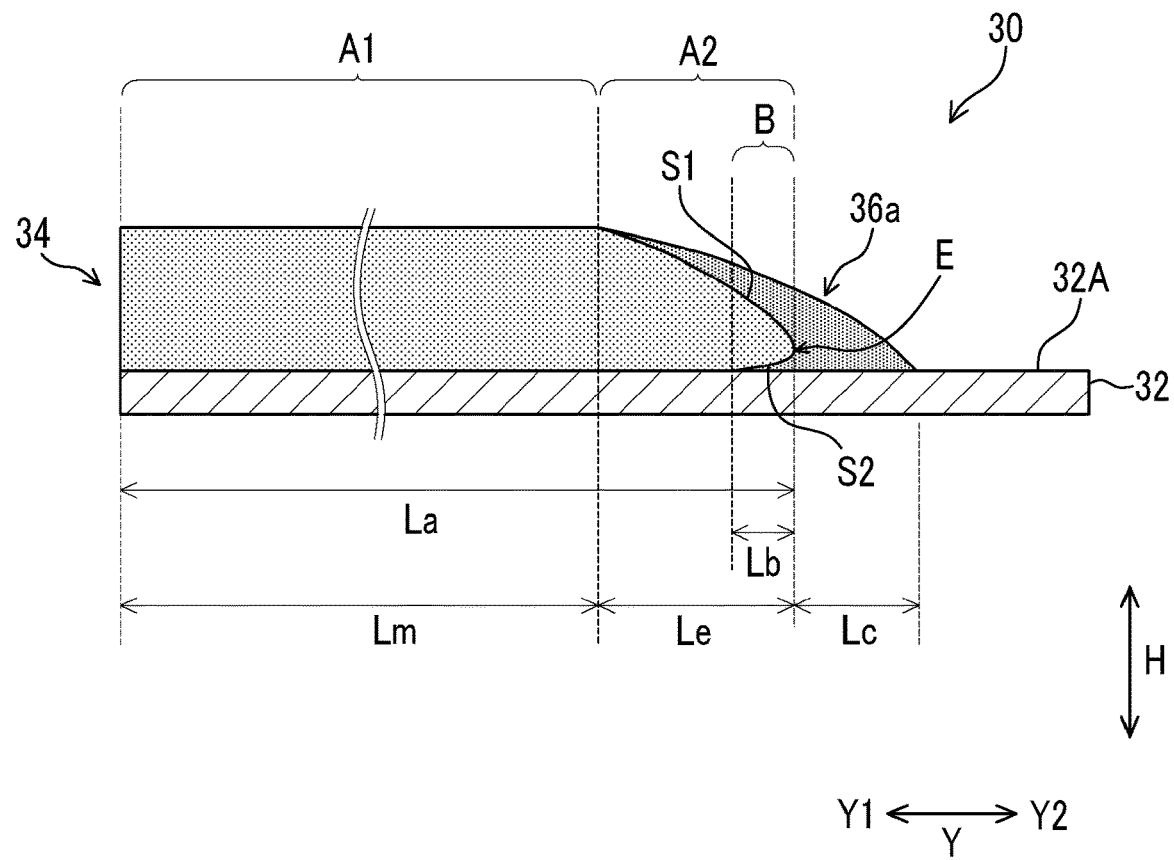
FIG. 4 is a schematic sectional view illustrating a configuration of a first insulating layer.

As shown in FIG. 4, the positive electrode active material layer 34 has, in a sectional view, a flat region A1 where the surface of the positive electrode active material layer 34 is flat and has a substantially uniform thickness, and an end portion region A2 where the surface of the positive electrode active material layer 34 is curved toward the positive electrode current collector 32 toward an end portion E. The flat region A1 is formed on the surface of the positive electrode current collector 32. The flat region A1 is in contact with the surface of the positive electrode current collector 32. Although not particularly limited, an average thickness of the flat region A1 may be approximately 10 to 200 μm, typically 20 to 150 μm, for example 40 to 100 μm. The flat region A1 herein includes the center of the positive electrode active material layer 34 in the width direction Y. The flat region A1 has a width Lm in the width direction Y.

The end portion region A2 extends from the flat region A1 in the Y2 direction. The entire end portion region A2 may be formed on the surface of the positive electrode current collector 32. In some embodiments, at least a part of the end portion region A2 may be formed on a surface of the first insulating layer 36a to be described later. A part of the end portion region A2 shown in FIG. 4 is stacked on the first insulating layer 36a. The end portion region A2 herein is formed from the surface of the positive electrode current collector 32 to the surface of the first insulating layer 36a. The end portion region A2 has a width Le in the width direction Y. The width Le is shorter than the width Lm of the flat region A1 in usual. Although not particularly limited, the width Le may be approximately 10 μm or larger, typically 20 to 10000 μm, for example, 30 to 5000 μm, or 50 to 500 μm. In the sectional view, the end portion region A2 has an inclined surface S1 having a thickness that continuously decreases toward the end portion of the positive electrode current collector 32 in the Y2 direction, and an inclined surface S2 having a thickness that continuously decreases toward the end portion of the positive electrode current collector 32 in the Y1 direction, contrary to the inclined surface S1. At least a part of the inclined surface S1 is typically covered with the first insulating layer 36a. In the configuration having the inclined surface S2, the entire inclined surface S2 is covered with the first insulating layer 36a. The end portion region A2 is not exposed in a plan view.

The insulating layer 36 includes an inorganic filler and a binder and has an electrical insulation property. Such an insulating layer 36 is typically formed by binding the inorganic filler to each other and to the positive electrode current collector 32, with the binder. The insulating layer 36 may be a porous layer that enables the charge carriers to pass. The insulating layer 36 includes the first insulating layer 36a and the second insulating layer 36b, for example, as shown in FIGS. 2 and 3. The first insulating layer 36a is disposed along the end portion of the positive electrode active material layer 34. The first insulating layer 36a is disposed along the end portion of the positive electrode active material layer 34 on a side where the non-coated portion 32A is provided (that is, in the Y2 direction). The second insulating layer 36b is provided at a position separated from the first insulating layer 36a. In other words, the non-coated portion 32A is provided between the first insulating layer 36a and the second insulating layer 36b. The non-coated portion 32A is provided on another side of the second insulating layer 36b different from the positive electrode active material layer 34 and the first insulating layer 36a (that is, the Y2 direction). The second insulating layer 36b is formed at a position facing the end portion of the negative electrode active material layer 44 of the negative electrode 40 that faces the second insulating layer 36b.

As shown in FIG. 4, the first insulating layer 36a is formed with a predetermined width Lc in the width direction. The width Lc is a distance between the end portion E of the positive electrode active material layer and the end portion of the first insulating layer 36a in the Y2 direction. The first insulating layer 36a is positioned at a boundary between the positive electrode active material layer 34 and the non-coated portion 32A in the width direction. Microscopically, for example, the first insulating layer 36a may be interposed between the positive electrode current collector 32 and the end portion E of the positive electrode active material layer 34, as shown in FIG. 4. Further, the first insulating layer 36a may be disposed to cover at least a part of the inclined surface S1 of the positive electrode active material layer 34, and may be disposed such that a part thereof covers an upper surface of the positive electrode active material layer 34. In some examples, for example, as shown in FIG. 4, the first insulating layer 36a may cover the entire inclined surface S1 of the positive electrode active material layer 34. In the end portion region A2, for example, an overlapping portion B in which the first insulating layer 36a that has been interposed between the positive electrode current collector 32 and the inclined surface S2, the end portion region A2 of the positive electrode active material layer 34, and the first insulating layer 36a that is stacked on the inclined surface S1 are stacked from the side close to the positive electrode current collector 32 may be formed. The overlapping portion B herein has an upper and lower three-layer structure. A width of the overlapping portion B is a dimension Lb by which the first insulating layer 36a is interposed between the positive electrode current collector 32 and the positive electrode active material layer 34. The maximum thickness of the overlapping portion B may be equal to or smaller than the average thickness of the flat region A1.

As shown in FIG. 3, the second insulating layer 36b is disposed by being separated from the first insulating layer 36a in the width direction Y. The second insulating layer 36b is positioned toward a Y1 direction side and a Y2 direction side from the end portion X (hereinafter, may be referred to a point X) of the negative electrode 40 in the Y2 direction. Both sides of the second insulating layer 36b in the width direction are sandwiched by the non-coated portion 32A. Thus, in the positive electrode 30, the positive electrode active material layer 34, the first insulating layer 36a, the non-coated portion 32A, the second insulating layer 36b, and the non-coated portion 32A are disposed consecutively in this order along the width direction Y.

Here, although not limited to the following width, the width Lc of the first insulating layer 36a may be 20% Ld or greater, when a distance between the end portion E of the positive electrode active material layer 34 and the end portion X of the negative electrode 40 in the Y2 direction is Ld. The width Lc has a relationship with the dimension of the second insulating layer 36b to be described later, and may be 25% Ld or greater, or 30% Ld or greater. However, depending on the relationship with the dimension of the second insulating layer 36b to be described later, the width Lc is appropriately approximately 60% Ld or smaller, and may be 50% Ld or smaller, 40% Ld or smaller, 30% Ld or smaller, or 25% Ld or smaller.

Also, a separation distance between the first insulating layer 36a and the second insulating layer 36b is appropriately 10% Ld or longer, and may be 20% Ld or longer, 30% Ld or longer, 40% Ld or longer, or 50% Ld or longer. However, it is appropriate that the separation distance is 60% Ld or shorter in view of the dimension relationship between the first insulating layer 36a and the second insulating layer 36b.

A dimension L1 of a portion of the second insulating layer 36b extending from the end portion X toward the Y1 direction is not limited, and may be 20% Ld or greater. The dimension L1 has a relationship with the dimension of the first insulating layer 36a or the separation distance described above, and may be 25% Ld or greater, or 30% Ld or greater. Note that considering the dimension of the first insulating layer 36a or the separation distance, the dimension L1 is appropriately approximately 60% Ld or smaller, and may be 50% Ld or smaller, 40% Ld or smaller, 30% Ld or smaller, or 25% Ld or smaller.

Also, a dimension L2 of a portion of the second insulating layer 36b extending from the end portion X toward the Y2 direction is not limited, and may be 20% Ld or greater. The dimension L2 is preferably short from the viewpoint of reducing the resistance of the lithium ion secondary battery 1, reducing foil collecting defects, or the like. From the viewpoint described above, the dimension L2 may be 50% Ld or smaller, and is appropriately 40% Ld or smaller or 30% Ld or smaller.

As the inorganic filler that forms the insulating layer 36, it is possible to use a material that does not soften or melt at a temperature of 600° C. or higher, typically 700° C. or higher, for example, 900° C. or higher, and has heat resistance and electrochemical stability to extent that the insulation between the positive electrode and the negative electrode can be maintained. Typically, the inorganic filler can be formed of the above-described inorganic material having the heat resistance and insulation property, a glass material, a composite material thereof, and the like. Specific examples of such inorganic filler include inorganic oxides such as alumina ($Al_2O_3$), magnesia (MgO), silica ($SiO_2$), and titania ($TiO_2$), nitrides such as aluminum nitride and silicon nitride, metal hydroxides such as calcium hydroxide, magnesium hydroxide, and aluminum hydroxide, clay minerals such as mica, talc, boehmite, zeolite, apatite, and kaolin, and glass materials. Among the materials, as the inorganic filler, it is preferable to use boehmite ($Al_2O_3 \cdot H_2O$), alumina ($Al_2O_3$), and silica ($SiO_2$), which have stable quality and are easily available, and boehmite having an appropriate hardness is more preferred. Any one of the materials may be contained alone, or two or more kinds thereof may be included in combination.

As the binder contained in the insulating layer 36, for example, various binders that can be used in the positive electrode active material layer can be preferably used. Among the binders, a vinyl halide resin such as polyfluoride vinylidene (PVdF) can be preferably used as the binder, from the viewpoint that the insulating layer 36 having an appropriate thickness is preferably formed while the binder imparts flexibility to the insulating layer 36 when a plurality of positive electrode current collectors 32 is bundled to collect current. A proportion of the binder contained in the insulating layer 36 is typically 1% by mass or more, preferably 5% by mass or more, and may be 8% by mass or more or 10% by mass or more. The binder contained in the insulating layer 36 is, for example, typically 30% by mass or less, 25% by mass or less, 20% by mass or less, 18% by mass or less, and 15% by mass or less. As a typical example, the proportion may be appropriately adjusted to 5% to 20% by mass. A basis weight of the insulating layer 36 may be approximately 0.5 $mg/cm^2$ or more, 0.7 $mg/cm^2$ or more, or 1 $mg/cm^2$ or more, and may be 1.5 $mg/cm^2$ or less, 1.3 $mg/cm^2$ or less, and 1.2 $mg/cm^2$ or less.

The insulating layer 36 may be configured to prevent a short circuit between the positive electrode current collector 32 and the negative electrode active material layer 44 from occurring, for example, even when the lithium ion secondary battery 1 is exposed to a high temperature environment of 150° C. From the viewpoint as described above, the thickness of the insulating layer 36 is preferably 3 µm or larger, and more preferably 4 µm or larger. Here, the short circuit between the positive electrode 30 and the negative electrode 40 is not limited to the short circuit between the positive electrode current collector 32 and the negative electrode active material layer 44. For example, in the positive electrode current collector 32, since a soft aluminum foil is generally used, and thus, burrs are difficult to be generated at the time of cutting. On the other hand, a copper foil, which is often used as the negative electrode current collector 42, may generate burrs having a relatively high height along the thickness direction, at the time of cutting. The burrs of the negative electrode current collector 42 locally concentrate the current during overcharging to form a high potential region, which may deteriorate or decompose the electrolytic solution, the separator, and the positive electrode active material in the vicinity thereof. Therefore, the second insulating layer 36b preferably has a thickness that can eliminate the adverse effect of the burrs of the negative electrode current collector 42. The burrs of the type of negative electrode current collector 42 are rarely formed to be higher than the thickness of the negative electrode current collector 42 itself. From the viewpoint described above, the thickness of the second insulating layer 36b (which may be the insulating layer 36) is preferably equal to or greater than the thickness of the negative electrode current collector 42. The second insulating layer 36b (which may be the insulating layer 36) having an excessively large thickness is not preferable from the viewpoint of directly increasing the cost or decreasing the capacity density per unit weight. From the viewpoint as described above, the thickness of the insulating layer 36 may be typically 20 μm or smaller, for example, 18 μm or smaller, 15 μm or smaller, or 10 μm or smaller (for example, less than 10 μm), or may be 8 μm or smaller.

An average particle diameter of the inorganic filler is not particularly limited. From the viewpoint of preferably forming the insulating layer 36 having the thickness, the average particle diameter is typically 3 μm or smaller, preferably 2 μm or smaller, and for example, 1 μm or smaller. However, a too fine inorganic filler is inferior in handleability or uniform dispersibility, and thus not preferable. Therefore, the average particle diameter of the inorganic filler is typically 0.05 μm or larger, preferably 0.1 μm or larger, for example 0.2 μm or larger. The average particle diameter is the cumulative 50% particle diameter in volume-based particle size distribution obtained by a laser diffraction scattering method, similar to the positive electrode active material and the like.

The negative electrode 40 is configured by providing the negative electrode active material layer 44 on the negative electrode current collector 42. The negative electrode current collector 42 is provided with a non-coated portion 42A where the negative electrode current collector 42 is exposed, without forming the negative electrode active material layer 44 for current collection. The negative electrode active material layer 44 contains a negative electrode active material. Typically, the particulate negative electrode active materials may be bonded to each other by a binder (binding agent) and may be bonded to the negative electrode current collector 42. The negative electrode active material stores and releases lithium ions, which are charge carriers, from or to the electrolytic solution in accordance with charging and discharging. As the negative electrode active material, various materials used in the related art as a negative electrode active material of a lithium ion secondary battery can be used without particular limitation. Preferred examples thereof include carbon materials typified by artificial graphite, natural graphite, amorphous carbon, and composites thereof (for example, amorphous carbon-coated graphite), or lithium storage compounds such as a material, such as silicon (Si), forming an alloy with lithium, lithium alloys thereof (such as $Li_xM$, M is C, Si, Sn, Sb, Al, Mg, Ti, Bi, Ge, Pb, or P, and X is a natural number), and a silicon oxide (SiO). The negative electrode 40 can be produced, for example, by supplying a negative electrode paste obtained by dispersing a powdery negative electrode active material and a binder (for example, rubbers such as styrene-butadiene copolymers (SBR) and acrylic acid-modified SBR resin (SBR latex) and cellulosic polymers such as carboxymethyl cellulose (CMC)) in an appropriate dispersion medium (for example, water or N-methyl-2-pyrrolidone, preferably water), to the surface of the negative electrode current collector 42, and then removing the dispersion medium by drying. As the negative electrode current collector, a conductive member made of a metal having a good conductivity (for example, copper, nickel, titanium, and stainless steel, typically the copper) can be preferably used.

The separator 50 is a component that insulates the positive electrode 30 and the negative electrode 40 from each other and provides a movement path of the charge carriers between the positive electrode active material layer 34 and the negative electrode active material layer 44. Such separator 50 is typically disposed between the positive electrode active material layer 34 and the negative electrode active material layer 44. The separator 50 may have a function of holding the non-aqueous electrolytic solution and a shutdown function of closing the movement path of the charge carriers at a predetermined temperature. Such separator 50 can be preferably configured by a microporous resin sheet made of resin such as polyethylene (PE), polypropylene (PP), polyester, cellulose, and polyamide. Among the microporous sheet made of resins, the microporous sheet made of polyolefin resin such as PE and PP has the shutdown temperature that can be preferably set in a range of 80° C. to 140° C. (typically 110° C. to 140° C., for example 120° C. to 135° C.), and thus is preferable. The shutdown temperature is a temperature at which the electrochemical reaction of the battery is stopped when the battery generates heat, and shutdown is typically expressed by melting or softening the separator 50 at the temperature. The separator 50 may have a single-layer structure formed of a single material, and may have a structure in which two or more kinds of microporous resin sheets having different materials or properties (for example, average thickness and porosity) are stacked (for example, a three-layer structure in which PP layers are stacked on both sides of PE layer).

A thickness (average thickness, the same is applied to the followings) of the separator 50 is not particularly limited, and can be usually 10 μm or larger, typically 15 μm or larger, and for example, 17 μm or larger. An upper limit thereof can be 40 μm or smaller, typically 30 μm or smaller, and for example 25 μm or smaller. When the average thickness of a substrate is within the above range, permeability of the charge carriers can be favorably maintained, and a minute short circuit (leakage current) is less likely to occur. Therefore, both the input-output density and safety can be achieved at a high level.

As the non-aqueous electrolytic solution, typically, those obtained by dissolving or dispersing a supporting salt as an electrolyte in a non-aqueous solvent (for example, lithium salt, sodium salt, and magnesium salt, and the lithium salt in a lithium ion secondary battery) can be used without particular limitation. Alternatively, the non-aqueous electrolyte may be a so-called polymer electrolyte or solid electrolyte in which a polymer is added to a liquid non-aqueous electrolyte to form a gel. As the non-aqueous solvent, it is possible to use various organic solvents such as carbonates, ethers, esters, nitriles, sulfones, and lactones, which are used as the electrolytic solution in a general lithium ion secondary battery without any particular limitation. Specific examples thereof include chain carbonates such as diethyl carbonate (DEC), dimethyl carbonate (DMC), and ethylmethyl carbonate (EMC), and cyclic carbonates such as ethylene carbonate (EC) and propylene carbonate (PC). Among the examples, it is preferable to partially include a solvent (for example, a cyclic carbonate) which is decomposed in an acidic atmosphere of the positive electrode to generate hydrogen ions. Such non-aqueous solvent may be fluorinated. Also, one kind of the non-aqueous solvents may be used alone or two or more kinds thereof can be used in a mixed solvent. As the supporting salt, various salts used in general lithium ion secondary batteries can be appropriately selected and used. For example, a lithium salt such as $LiPF_6$, $LiBF_4$, $LiClO_4$, $LiAsF_6$, $Li(CF_3SO_2)_2N$, and $LiCF_3SO_3$ is used. In the technology disclosed herein, the effect of suppressing heat generation during overcharge can be obtained. Therefore, for example, when a lithium compound containing fluorine that is decomposed during overcharge to generate hydrogen fluoride (HF) is used as the supporting salt, the effect of the present technology is easily exhibited, and thus is preferable. Such supporting salts may be used alone or two or more kinds thereof may be used in combination. The supporting salt is preferably prepared such that a concentration in the non-aqueous electrolyte falls within the range of 0.7 mol/L to 1.3 mol/L.

Further, the non-aqueous electrolyte may contain various additives and the like as long as the characteristics of the lithium ion secondary battery of the present disclosure are not impaired. As the additives, a gas generating agent, a film forming agent, or the like may be used for one or more purposes such as improving the input-output characteristics of the battery, improving the cycle characteristics, and improving the initial charge-discharge efficiency. Specific examples of the additives include an oxalato complex compounds such as fluorophosphate (preferably difluorophosphate; for example, lithium difluorophosphate represented by $LiPO_2F_2$) and lithium bis(oxalato)borate (LiBOB). It is suitable that the concentration of the additives in the whole non-aqueous electrolyte is usually 0.1 mol/L or less (typically 0.005 mol/L to 0.1 mol/L).

The lithium ion secondary battery 1 shown in FIG. 1 uses a flat rectangular battery case as the battery case 10. However, the battery case 10 may be a non-flat rectangular battery case, a cylindrical battery case, or a coin battery case. Alternatively, the battery case 10 may be a laminated bag formed by laminating a metal battery case sheet (typically an aluminum sheet) and a resin sheet in a bag shape. Further, for example, the battery case may be made of aluminum, iron, alloys of the metals, and high-strength plastic. The lithium ion secondary battery 1 shown in FIG. 1 includes a so-called wound electrode body 20. As shown in FIG. 2, a width W1 of the positive electrode active material layer 34, a width W2 of the negative electrode active material layer 44, and a width W3 of the separator satisfy the relationship of W1<W2<W3. In addition, the negative electrode active material layer 44 covers the positive electrode active material layer 34 at both end portions in the width direction, and the separator 50 covers the negative electrode active material layer 44 at both end portions in the width direction. However, the wound electrode body 20 of the lithium ion secondary battery 1 disclosed herein is not limited to the wound electrode body, and for example, may be a so-called flat plate type electrode body 20 having a form in which a plurality of positive electrodes 30 and negative electrodes 40 is stacked by being insulated by the separator 50. Alternatively, a single cell in which one positive electrode 30 and one negative electrode 40 are housed in the battery case.

The lid member 12 of the battery case 10 may be provided with a safety valve configured to discharge gas generated inside the battery case to the outside or an injection port by which an electrolytic solution is injected, similar to the battery case of a lithium ion battery of the related art. Further, the lid member 12 is provided with the positive electrode terminal 38 and the negative electrode terminal 48 for external connection in a state of being insulated from the battery case 10. The positive electrode terminal 38 and the negative electrode terminal 48 are electrically connected to the positive electrode 30 and the negative electrode 40 via a positive electrode current collecting terminal 38a and a negative electrode current collecting terminal 48a, respectively, and are configured to be able to supply power to an external load (see FIG. 1).

Method of Manufacturing Positive Electrode

A method of manufacturing the positive electrode 30 as described above is not limited. In some embodiments, for example, the positive electrode 30 can be produced by a manufacturing method including the following steps:

(S1) preparing positive electrode paste for forming a positive electrode active material layer;

(S2) preparing insulating layer paste for forming an insulating layer;

(S3) coating with the paste and drying the paste; and (S4) slitting.

Steps (S1) and (S2) are in no particular order, and either step may be performed first or both steps may be performed at the same time. Further, Step (S4) is optional and can be omitted in another embodiment. Hereinafter, the steps will be described in order.

In Steps (S1) and (S2), positive electrode slurry and insulating layer slurry are prepared, respectively. The positive electrode slurry and the insulating layer slurry can be prepared by dispersing the material forming the positive electrode active material layer 34 or the insulating layer 36 in an appropriate dispersion medium (such as water or NMP) and adjusting the viscosity and the like.

The paste can be prepared using a stirring or mixing device such as a ball mill, a roll mill, a planetary mixer, a disperser, or a kneader.

Viscosity V1 of the positive electrode active material layer-forming paste may be adjusted to a range of approximately 1,000 to 20,000 mPa·s, typically 5,000 to 10,000 mPa·s. The viscosity V1 can be adjusted by, for example, the solid content (for example, a constituent material or the binder) with respect to the solvent, an addition amount of the viscosity modifier, the kneading time of the paste, and the like. As a result, Step S3 to be described later can be stably and accurately performed. In the present specification, the "viscosity of paste" refers to a value measured at 25° C. with a rheometer at a shear rate of 21.5 $s^{-1}$.

The viscosity V2 of the insulating layer forming paste may be adjusted to a range of approximately 1000 to 5000 mPa·s, for example 1500 to 4500 mPa·s. The viscosity V2 can be adjusted by, for example, the solid content (for example, a constituent material or the binder) with respect to the solvent, an addition amount of the viscosity modifier, the kneading time of the paste, and the like. As a result, Step S3 to be described later can be stably and accurately performed.

In step S3 to be described later, when the so-called simultaneous coating method is adopted, the viscosity V2 of the insulating layer forming paste is set lower than the viscosity V1 of the positive electrode active material layer-forming paste (the viscosity is set to be low). As a result, a contact angle of the insulating layer forming paste to the positive electrode current collector 32 is smaller than the contact angle of the positive electrode active material layer-forming paste to the positive electrode current collector 32, and the insulating layer forming paste can be easily made to be get under the positive electrode active material layer-forming paste. Further, a ratio of the viscosity V2 to the viscosity V1 (V2/V1) may be adjusted in the range of approximately 0.01 to 0.99, and typically 0.05 to 0.95. Accordingly, the width of the overlapping portion B can be adjusted preferably within the above range.

In Step (S3), the end portion of the positive electrode current collector 32 in the Y2 direction is placed, and the two kinds of pastes are applied onto the positive electrode current collector 32. The application of the paste can be performed using a coating device such as a die coater, a slit coater, a comma coater, or a gravure coater. In an example, the two kinds of pastes are applied in three steps in order. That is, first, coating regions of the first insulating layer 36a and the second insulating layer 36b are coated with the insulating layer forming paste, while leaving the non-coated portion 32A of the positive electrode current collector 32. Next, the positive electrode current collector 32 and the first insulating layer 36a are coated with the positive electrode active material layer-forming paste with a predetermined width La. Then, the insulating layer forming paste is applied again with a predetermined width Lc to cover the entire end portion of the positive electrode active material layer. Thereafter, the positive electrode active material layer-forming paste and the insulating layer forming paste are dried by heating as necessary. As a result, the positive electrode 30 is coated.

At this time, from the viewpoint of productivity, the positive electrode 30 may be coated with a double-width. That is, first, two insulating layer forming pastes may be coated such that when the positive electrode active material layer is formed to have a width of 2×La, the first insulating layer 36a is positioned at both ends, and the second insulating layer 36b is positioned further separately on both end sides. Then, the positive electrode active material layer-forming paste is applied between the two first insulating layers 36a. The drying step may be the same as above. As a result, the double-width positive electrode 30 is coated.

Figure 5:
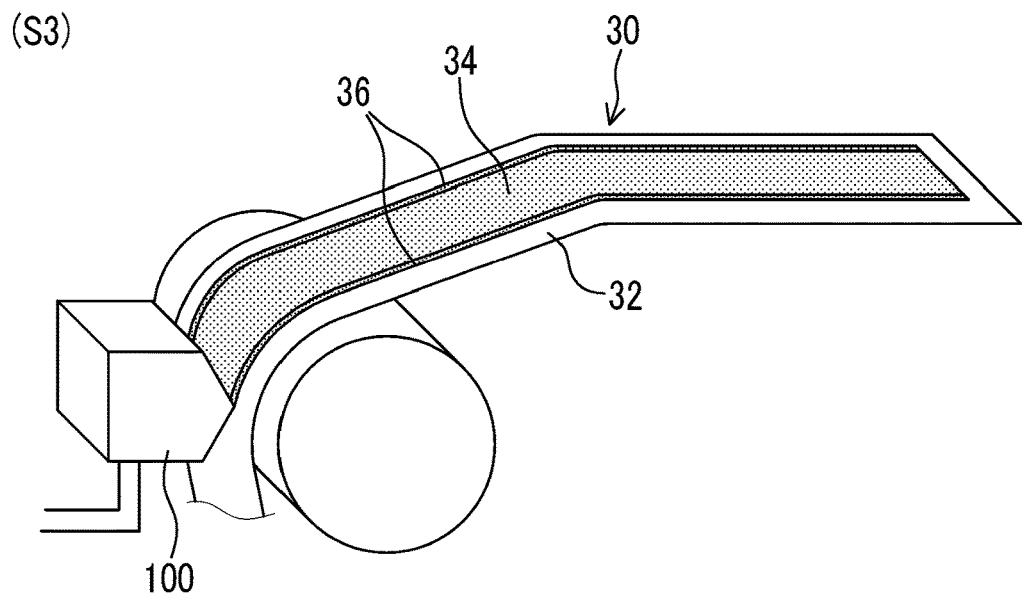
FIG. 5 is a schematic view illustrating a manufacturing step of a positive electrode according to an embodiment.

Alternatively, in another example, as shown in FIG. 5, in Step (S3), the positive electrode current collector 32 may be simultaneously coated with the two kinds of pastes using a die coater. By using the die coater, the positive electrode provided with the first insulating layer 36a and the second insulating layer 36b separated from each other can be preferably applied at one time.

Figure 6:
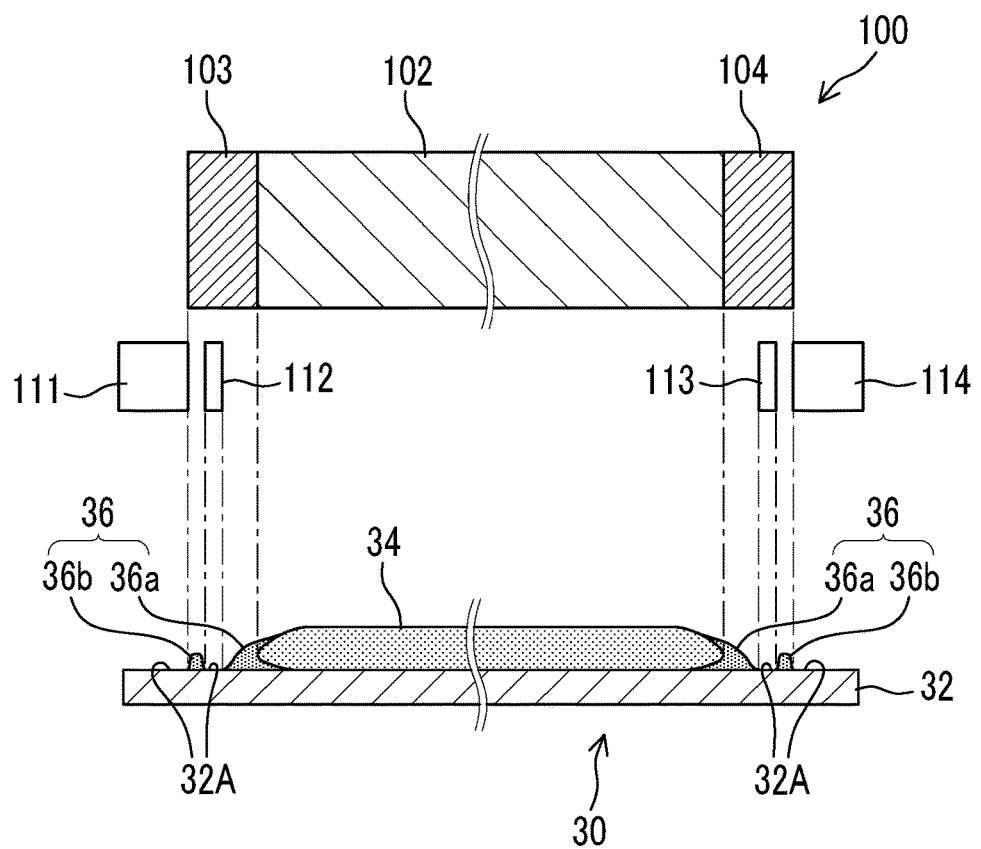
FIG. 6 is a schematic view illustrating a relationship between a die coater, a shim plate, and a positive electrode.

The upper part of FIG. 6 is a schematic view for schematically illustrating the configuration of a die coater 100. The middle part of FIG. 6 is a schematic view showing an approximate dimension and disposition of the shim plates to be combined with the die coater 100. The lower part of FIG. 6 is a schematic sectional view illustrating the configuration of the positive electrode formed by such die coater 100.

A basic configuration of the die coater 100 may be similar to that of a known die coater used for manufacturing electrodes of the type of secondary battery. The die coater 100 includes a set of upper and lower members called a die, and a slurry housing portion called a manifold is provided between a pair of dies. In addition, the die coater is configured such that a slit for discharging the slurry housed in the manifold is formed between the dies, and a shape or gap of the slit can be adjusted at discretion, by inserting or attaching the shim plate in or to the slit or the like. Then, the slurry is supplied to the manifold in the die by a pump or the like, and the substrate disposed at discharge port of the slit can be coated with the slurry by discharging the slurry in a state of being sheared from the slit.

In some embodiments, the die coater 100 is configured to manufacture double-width electrodes. For example, as shown in the upper part of FIG. 6, the die coater 100 includes a first die 102, and a second die 103 and a third die 104 provided on both sides of the first die 102. The disposition direction of the dies 102, 103, 104 is a direction (for example, horizontal direction) orthogonal to the delivery direction (for example, vertical direction) of the substrate. The first die 102 at the center is a die for coating the positive electrode active material layer 34. The two dies 103, 104 on both sides are dies for coating the insulating layer 36, respectively. The manifold of the die 102 contains the positive electrode slurry for forming the positive electrode active material layer 34, and the manifold of each of the dies 103, 104 contains the insulating layer slurry for forming the insulating layer 36.

In the dies 102, 103, 104, a slit is disposed in a straight line along the horizontal direction (lateral direction in the drawing). The positive electrode slurry and the insulating layer slurry are continuously discharged in the width direction like a waterfall from the slit of each of the dies 103, 102, 104, and are supplied sequentially onto the positive electrode current collector 32 (substrate) to be transported at a discharge port position of the slit. Accordingly, basically, the insulating layer 36 corresponding to the width of the slit of the die 103, the positive electrode active material layer 34 corresponding to the width of the slit of the die 102, and the insulating layer 36 corresponding to the width of the slit of the die 104 are applied to the surface of the positive electrode current collector 32 to be adjacent to each other in this order in a strip shape along the flow direction. Here, the shim plates 111, 112, 113, 114 having a shape shown in the middle of FIG. 6 can be attached to the die coater 100. The shim plates 111, 114 are baffle plates that regulate the insulating layer paste not to be supplied to a region of the positive electrode current collector 32 that should form the non-coated portion 32A. The shim plates 112, 113 are baffle plates which partition the insulating layer 36 to the first insulating layer 36a and the second insulating layer 36b and sufficiently separate the first insulating layer 36a and the second insulating layer 36b from each other, such that the insulating layer paste is not supplied to the region of the positive electrode current collector 32 that should form the non-coated portion 32A. Dimensions such as widths and thicknesses of the shim plates 112, 113 and installation positions can be appropriately adjusted such that the first insulating layer 36a and the second insulating layer 36b having desired dimensions are formed. The drying step may be the same as above. As a result, the double-width long positive electrode 30 is coated.

In Step (S4), the produced positive electrode 30 is slit (cut) as necessary. The positive electrode 30 formed with a double-width is cut into two at the center of the positive electrode active material layer 34 in the width direction. Accordingly, the positive electrode 30 having a predetermined width can be obtained. Further, the positive electrode 30 formed to be long is cut into appropriate lengths in the length direction. Accordingly, the positive electrode 30 having a predetermined length can be obtained.

Hereinafter, as a specific example, the non-aqueous electrolyte secondary battery disclosed herein was produced. The present disclosure is not intended to be limited to the following specific examples.

REFERENCE EXAMPLE

Production of Positive Electrode

A lithium nickel cobalt manganese-containing composite oxide (LiNi$_{1/3}$Co$_{1/3}$Mn$_{1/3}$O$_2$:NCM) having a layered structure as the positive electrode active material, acetylene black (AB) as a conduction aid, and polyvinylidene fluoride (PVdF) as a binder were mixed in a mass ratio of NCM:AB:PVdF=90:8:2 and kneaded with N-methyl-2-pyrrolidone (NMP) as a solvent, and accordingly, a positive electrode paste was prepared.

Also, boehmite as an inorganic filler (F) and PVdF as a binder (B) were mixed in a mass ratio of F:B=90:10, and kneaded in NMP as a solvent, and accordingly, an insulating layer forming paste was prepared.

Then, the prepared positive electrode paste and insulating layer forming paste were respectively accommodated in a positive electrode paste accommodating portion and an insulating layer paste accommodating portion of the die coater (the die coater described above) shown in FIG. 4. The shim plates 111, 114 for forming the non-coated portion of the positive electrode current collector were installed in the die coater, and other shim plates 112, 113 were not installed. Then, two kinds of pastes were applied at the same time to a long aluminum foil having a thickness of approximately 12 as a positive electrode current collector, dried, and then slit (cut) at the center in the width direction, and further cut to have a predetermined length, and accordingly the positive electrode was produced. In this case, the viscosities of both pastes were adjusted such that the ratio (V2/V1) of the viscosity V2 of the insulating layer forming paste to the viscosity V1 of the positive electrode paste was approximately 0.4.

The obtained positive electrode is provided with the positive electrode active material layer, the insulating layer, and the non-coated portion on the surface of the positive electrode current collector in this order in the width direction. Also, in the positive electrode, it was confirmed that the insulating layer was formed to be adjacent to the end portion of the positive electrode active material layer in the width direction, and such that in the adjacent position, a part thereof was interposed between the positive electrode current collector and the end portion of the positive electrode active material layer and covers the end portion of the positive electrode active material layer. The thickness (flat portion) of the positive electrode active material layer was fixed at approximately 52 μm. The dimension of the insulating layer in the width direction was fixed with a length of 120%, when the distance from the end portion E of the positive electrode active material layer to a point X where the end portion of the negative electrode active material layer is positioned when facing the negative electrode to be described later is 100%. The positive electrodes of Reference Examples 1 to 7 were obtained by changing the thickness (flat portion) of the insulating layer between 1 μm and 100 μm as shown in Table 1 below. The thickness of the insulating layer was adjusted by changing a gap with a shim plate installed between the two dies of the die coater. In the positive electrode of Reference Example 7, the thickness of the insulating layer is significantly thicker than the thickness of the positive electrode active material layer.

Production of Negative Electrode

Graphite (C) as a negative electrode active material, styrene butadiene rubber (SBR) as a binder, and carboxymethyl cellulose (CMC) as a thickener were mixed in a mass ratio of C:SBR:CMC=98:1:1, and a negative electrode paste was prepared by blending and kneading with ion-exchanged water. Then, the prepared negative electrode paste was applied to a long copper foil having a thickness of 8 μm as a negative electrode current collector using a die coater, dried and then slit (cut) at the center in the width direction. Further, a negative electrode having a negative electrode active material layer was obtained by cutting in a predetermined length. In order to collect current, the negative electrode was provided with non-coated portions, in which the negative electrode active material layer was not formed, on both end portions in the width direction before slitting.

Production of Evaluation Cell

The positive electrode and the negative electrode of each example prepared above were stacked to be insulated from each other via a separator to form a layered product. The layered product was housed in a laminate bag together with a non-aqueous electrolytic solution. As the separator, a porous sheet having a three-layer structure of PP/PE/PP was used. As the non-aqueous electrolytic solution, a mixed solvent containing ethylene carbonate (EC), ethylmethyl carbonate (EMC), and dimethyl carbonate (DMC) in a volume ratio of EC:EMC:DMC=3:3:4 in which $LiPF_6$ as a supporting salt was dissolved at a concentration of 1 mol/L was used. Accordingly, laminate cells of Reference Examples 1 to 7 were constructed. 10 laminate cells were prepared for each example in order to reduce the influence of manufacturing variations.

Overcharge Test

The laminate cells of each example were charged at a constant current (CC) at a rate of about 1/3 C until the voltage reached 4.1 V under a temperature environment of 25° C., and then charged at a constant voltage (CV) until the current reached about 1/50 C. Accordingly, the cells of each example were subjected to an activation treatment. Next, a state of charge (SOC) of the cells were defined as SOC 100%, and CC discharge was performed at a rate of about 1/3 C until the voltage reached 3V. The discharge capacity at this time was recorded and the state of charge of the cell with the voltage of 3V was defined as SOC 0%.

Then, a thermocouple was attached to the center of the laminate cell on the outside (bag surface) of each example, and CC charging was performed at a rate of 100 C under a temperature environment of 25° C. until the cell voltage reached 5.1 V (overcharged state). At this time, the highest temperature of the cell was recorded and a temperature rise width (° C.) from 25° C. was calculated. Then, the temperature rise width (arithmetic mean value) of the cells of each example was standardized with the temperature rise width (arithmetic mean value) of the laminate cell of Reference Example 7 as a reference (100%), and results thereof were shown in Table 1.

TABLE 1

| Reference Example | Thickness of insulating layer [μm] | Temperature rise rate (%) |
|---|---|---|
| 1 | 1 | 130 |
| 2 | 3 | 118 |
| 3 | 5 | 109 |
| 4 | 8 | 100 |
| 5 | 10 | 99 |
| 6 | 20 | 101 |
| 7 | 100 | 100 |

As shown in Table 1, in the cells of Reference Examples 4 to 7 in which the thickness of the insulating layer was 8 μm or larger, there was almost no heat generation due to overcharge, and therefore a temperature rise rates of the cells were almost the same as each other as 99% to 101%. On the other hand, in the cells of Reference Examples 1 to 3 in which the thickness of the insulating layer was smaller than 8 μm, the temperature rise rate due to overcharge significantly exceeds 100%, and was 109% to 130%. It was found that the smaller the thickness of the insulating layer, the larger the temperature rise rate.

In the laminate cell of Reference Example 7, since the thickness of the insulating layer was sufficiently thicker than the thickness of the positive electrode active material layer, it is unlikely that a short circuit will occur in the region where the insulating layer was formed. From above, it is considered that a minute short circuit in the overcharged state is preferably suppressed, not only in the cells of Reference Example 7 but also in the cells of Reference Examples 4 to 6.

On the other hand, in the cells of Reference Examples 1 to 3, the smaller the thickness of the insulating layer, the higher the temperature rise rate. Therefore, it is considered that a minute short circuit occurs at any position where the insulating layer was provided, which causes extra heat generation, and cell temperatures increased due to the occurrence. Here, the cut end portion of the negative electrode was positioned at the end portion of the negative electrode facing the insulating layer, but it was confirmed that burrs are easily generated in the negative electrode current collector at the time of cutting the negative electrode. Malleability of metal is higher in the order of Au>Ag>Cu>Al. However, Cu tends to generate burrs in the work of cutting the current collector, but Al does not generate many burrs. It was confirmed that even if the burrs of the negative electrode current collector were large, it did not grow to the same height as the thickness of the negative electrode current collector. From the above, in the cells of Reference Examples 1 to 3, it was considered that burrs due to the cutting of the negative electrode current collector at the end portion portion of the negative electrode were generated, and the presence of these burrs caused a physical minute short circuit, or a potential was concentrated at the burr position and locally reached a high voltage so that the decomposition of the active material was promoted.

From the above, it can be said that it is effective to provide the insulating layer at least at a position facing the cut end portion of the negative electrode (that is, the cut position of the end portion of the negative electrode active material layer). In addition, it can be said that the thickness of the insulating layer is preferably equal to or larger than the thickness of the negative electrode current collector in consideration of the generation of burrs on the negative electrode current collector.

Test Example

Production of Positive Electrode

Positive electrodes of Examples 1 to 6 were produced in the same manner as in Reference Example 4 (thickness of insulating layer: 8 μm) except for the followings. Then, the laminate cells of Examples 1 to 6 were produced, using the positive electrodes of Examples 1 to 6, in the same manner as in the reference example. In addition, 10 laminate cells were prepared for each example, for each of the following evaluation tests, in order to reduce the influence of manufacturing variations.

Example 1

In the positive electrodes of Example 1, the positive electrodes having no insulating layer were produced using the positive electrode paste alone without using the insulating layer forming paste.

Example 2

In Example 2, first, the positive electrode active material layer without forming the insulating layer was formed of the positive electrode paste alone (the same as the positive electrode of Example 1). Next, the insulating layer forming paste was accommodated in both the positive electrode paste accommodating portion and the insulating layer paste accommodating portion of the die coater, and the current collecting part was left as a non-coated portion, and an insulating layer having a thickness of 8 μm was formed on the entire surface of the other positive electrode, using the shim plates 111, 114 alone. As a result, the positive electrode having a structure in which a region serving as a current collecting part (welding part) of the positive electrode current collector of Example 1 was a non-coated portion along the end portion in the width direction, and the insulating layer was provided on the entire surface of the other region.

Example 3

In Example 3, the shim plates 112, 113 for dividing the insulating layer forming paste into two strips and the shim plates 111, 114 for forming the non-coated portion of the positive electrode current collector were installed in a slit part of the die coater that discharges the insulating layer forming paste, and the positive electrode active material layer, the first insulating layer, the non-coated portion, the second insulating layer, and the non-coated portion were formed on the positive electrode current collector in this order in the width direction. Each of the shim plates 111, 112, 113, 114 was adjusted in position and dimension such that the first insulating layer was formed to be adjacent to the positive electrode active material layer, and such that in the adjacent position, a part thereof was interposed between the positive electrode current collector and the end portion of the positive electrode active material layer and covers the end portion of the positive electrode active material layer. Also, the position was adjusted such that the second insulating layer was formed at a position facing the end portion of the negative electrode active material layer. Further, the shim plate was adjusted in position and dimension, such that the dimension of the first insulating layer in the width direction was 20% from the end portion E toward the point X, when the distance from the end portion E of the positive electrode active material layer to the point X where the end portion of the facing negative electrode active material layer was positioned was 100%. Also, the shim plate was adjusted in position, dimension, and gap, such that the dimension of the second insulating layer in the width direction was 10% from the point X toward the end portion E and 10% toward the opposite side (end portion side of the current collector) (total 20%) and the thickness (flat portion) was 8 μm.

Example 4

In Example 4, the positive electrode active material layer and the first insulating layer were formed in the same manner as in Example 3, and each of the shim plates was adjusted in position and dimension such that the dimension of the second insulating layer in the width direction is 20% from the point X toward the end portion E, and 20% toward the opposite side (total 40%).

Example 5

In Example 5, the positive electrode active material layer and the first insulating layer were formed in the same manner as in Example 3, and each of the shim plates was adjusted in position and dimension such that the dimension of the second insulating layer in the width direction is 50% from the point X toward the end portion E, and 50% toward the opposite side (total 100%).

Example 6

In Example 6, the positive electrode active material layer and the first insulating layer were formed in the same manner as in Example 3, and each of the shim plates was adjusted in position and dimension such that the dimension of the second insulating layer in the width direction is 50% from the point X toward the end portion E, and 20% toward the opposite side (total 70%).

Overcharge Test

When the overcharge test was performed on the laminate cells in each example, in the same manner as in the reference example, the highest temperature of the cell was recorded and a temperature rise width (° C.) from 25° C. was calculated. Then, the temperature rise width (arithmetic mean value) of the cells of each example was standardized with the temperature rise width (arithmetic mean value) of the laminate cell of Example 2 in which the insulating layer was provided on the entire surface except for a current collecting part as a reference (100%), and results thereof were shown in Table 2 below.

Low Temperature Resistance Measurement

First, the laminate cells of each example were charged at a constant current (CC) at a rate of about 1/3 C until the voltage reached 4.2 V under a temperature environment of 25° C., and then charged at a constant voltage (CV) until the current value reached 1/50 C. The state of charge (SOC) was defined as full charge (SOC 100%). After that, a rest period was provided for 5 minutes, and CC discharge was performed at a rate of 1/3 C up to 3.0 V, thereby performing an initial charge treatment. A IV resistance value (arithmetic mean value) when the cells of each example after the initial charging were charged to SOC 60% at a constant current of 15 C in an environment of −10° C. was calculated, and results thereof were shown in Table 2 below. In addition, Table 2 shows the values when the IV resistance value (arithmetic mean value) of the batteries of Example 1 having no insulating layer was standardized (100%).

TABLE 2

| | Dimension from point X | | | |
|---|---|---|---|---|
| Reference Example | End Portion E side [%] | Current collector end portion side [%] | Temperature rise rate (%) | Resistance value [%] |
| 1 | None | None | 150 | 100 |
| 2 | Entire surface on positive electrode active material layer | None | 100 | 110 |
| 3 | 10 | 10 | 120 | 102 |
| 4 | 20 | 20 | 99 | 98 |
| 5 | 50 | 50 | 101 | 109 |
| 6 | 50 | 20 | 100 | 101 |

As shown in Table 2, it was confirmed that the laminate cell of Example 1 in which the insulating layer was not provided on the positive electrode had the second lowest resistance value among all the examples, and it was found that formation of the insulating layer on the electrode can cause an increase in the internal resistance of the cell. However, in the laminate cells of Example 1, it was found that a minute short circuit occurs at the time of overcharging, and the temperature rise rate reaches 150%, which is an extremely high temperature. From the above, it can be said that it is preferable to provide the insulating layer in consideration of the safety of the battery.

Next, in the laminate cells of Example 2 in which the entire surface of the positive electrode other than the current collecting part was covered with an insulating layer having an appropriate thickness, it was confirmed that the temperature rise rate was the second lowest in all cases, and a minute short circuit occurred in the overcharged state was sufficiently suppressed. However, as shown in Table 2, the laminate cells of Example 2 have the highest resistance. It was confirmed that in the cells of Example 2, the insulating layer was excessively provided when compared with the other examples, and this insulating layer became an internal resistance. From the above, it can be said that it is preferable to provide the insulating layer just at an appropriate position in consideration of reduction of the resistance of the battery.

In the laminate cell of Example 3, the insulating layer was provided separately for the first insulating layer and the second insulating layer, and for example, it was confirmed that the resistance was significantly reduced as compared with the cells of Example 2. From the above, it can be said that the insulating layer is preferably provided on an appropriate position with the first insulating layer and the second insulating layer separated from each other. However, it was found that the laminate cell of Example 3 recorded a high rate of temperature rise during overcharge, following Example 1. Thus, it is suggested that a minute short circuit occurred during overcharge. In the laminate cells of Example 3, the second insulating layer was formed just in a narrow range (width) of 10% inward and outward in the width direction centering on the point X. Therefore, depending on the coating accuracy of the insulating layer or the active material layer, the dimensional accuracy of the electrodes, the variation in the overlapping accuracy of the positive electrode and the negative electrode, the second insulating layer may not be disposed at a position sufficiently corresponding to the burr generation position, generated at an end portion of the negative electrode current collector, and it is expected that it is difficult to suppress the internal short circuit stably. Therefore, when the insulating layer is provided separately for the first insulating layer and the second insulating layer, it can be said that it is preferable to design the dimension of the second insulating layer to be a little wider.

In the laminate cells of Example 4, the insulating layer is divided into the first insulating layer and the second insulating layer, and the second insulating layer is formed in a range (width) of 20% inward and outward in the width direction centering on the point X. In this case, it was found that both the temperature rise rate and the resistance value were the lowest values of all the examples and were preferable. From the above, it was found that the influence seen in Example 3 such as coating accuracy of the insulating layer or the active material layer, the dimensional accuracy of the electrodes, the variation in the overlapping accuracy of the positive electrode and the negative electrode can be followed by forming the second insulating layer with the dimensions of 20% each inside and outside centering on the point X. In order to successfully alleviate such manufacturing variations, it can be said that the second insulating layer preferably has a total width of about 40% centering on the point X. Also, it can be said that the same applies to the dimensions of the first insulating layer.

In the laminate cells of Example 5, the insulating layer is provided separately for the first insulating layer and the second insulating layer, but the gap is relatively small, and the dimension from the point X of the second insulating layer to the outer side in the width direction is relatively wide at 50%. Therefore, it was confirmed that temperature rise rate was almost the same low value as the cells of Example 2 in which the insulating layer was provided on the entire surface, but the resistance value was also a high value comparable to that of Example 2. On the other hand, in the laminate cells of Example 6, the dimension from the point X of the second insulating layer toward the inner side in the width direction is the same as that of Example 5, and the dimension toward the outer side is narrowed to 20%. As a result, the cells of Example 6 have a slightly higher temperature rise rate and a higher resistance than those of the cells of Example 4, but the resistance is significantly reduced as compared with the cells of Example 5. From above, it is suggested that by securing the wide non-coated portion having no insulating layer near the end portion of the electrode in the width direction, disposition of an insulating layer, which becomes a resistance component, near the current collecting part is avoided, and current collection efficiency is improved. From above, it can be said that it is preferable that the second insulating layer is not provided excessively wide toward the outer side in the width direction.

From the above, it can be said that the insulating layer is preferably provided on an appropriate position with the first insulating layer and the second insulating layer separated from each other. It can be said that the second insulating layer may be formed about more than 10% (for example, 20% or more) and 50% or less (for example, 40% or less) inward in the width direction with the point X corresponding to the end portion of the facing negative electrode as a center. The first insulating layer may be formed by being separated from the second insulating layer and, for example, 70% or less, preferably 50% or less, for example 30% or less, from the end portion E of the positive electrode active material layer toward the outer side in the width direction (point X side). It can be said that the first insulating layer is preferably formed to be 20% or more from the viewpoint of manufacturing variations.

Specific examples of the present disclosure have been described above in detail, but these are merely examples and do not limit the scope of the claims. The technology described in claims includes various modifications and changes of the specific examples illustrated above.

What is claimed is:

1. A non-aqueous electrolyte secondary battery comprising:
a positive electrode;
a negative electrode facing the positive electrode; and
a non-aqueous electrolyte, wherein:
the positive electrode includes
a positive electrode current collector,
a positive electrode active material layer which is provided on a part of a surface of the positive electrode current collector and contains a positive electrode active material, and
an insulating layer which is provided on other parts of the surface of the positive electrode current collector and contains an inorganic filler;
the negative electrode includes
a negative electrode current collector, and
a negative electrode active material layer which is provided on a part of a surface of the negative electrode current collector and contains a negative electrode active material; and
the insulating layer includes
a first insulating layer disposed along an end portion of the positive electrode active material layer, and
a second insulating layer formed at a position which is separated from the first insulating layer and faces an end portion of the negative electrode active material layer;
wherein the first insulating layer and the second insulating layer are separated from each other in the width direction of the positive electrode; and
wherein the first insulating layer, non-coated portion, and the second insulating layer are positioned in this order in the width direction of the positive electrode.

2. The non-aqueous electrolyte secondary battery according to claim 1, wherein an average thickness of the second insulating layer is equal to or greater than a thickness of the negative electrode current collector.

3. The non-aqueous electrolyte secondary battery according to claim 1, wherein the first insulating layer is formed to be interposed between the positive electrode current collector and the end portion of the positive electrode active material layer and to cover the end portion of the positive electrode active material layer.

4. The non-aqueous electrolyte secondary battery according to claim 1, wherein an end portion of the negative electrode on a side facing the second insulating layer is formed by a cut surface.

* * * * *